(12) United States Patent
Sakata

(10) Patent No.: US 7,070,175 B2
(45) Date of Patent: Jul. 4, 2006

(54) ANTI-VIBRATION DEVICE

(75) Inventor: Toshifumi Sakata, Osaka (JP)

(73) Assignee: Toyo Tire & Rubber Co., LTD, Osaka (JP)

( * ) Notice: Subject to any disclaimer, the term of this patent is extended or adjusted under 35 U.S.C. 154(b) by 0 days.

(21) Appl. No.: 10/515,058

(22) PCT Filed: Jun. 15, 2004

(86) PCT No.: PCT/JP2004/008339

§ 371 (c)(1),
(2), (4) Date: Nov. 19, 2004

(87) PCT Pub. No.: WO2005/100815

PCT Pub. Date: Oct. 27, 2005

(65) Prior Publication Data
US 2005/0225015 A1 Oct. 13, 2005

(30) Foreign Application Priority Data
Apr. 8, 2004 (JP) .............................. 2004-114536

(51) Int. Cl.
F16F 5/00 (2006.01)
(52) U.S. Cl. .................. 267/140.13; 267/219
(58) Field of Classification Search ........... 267/140.13, 267/140.11, 219, 140.14, 220; 29/521, 525.01, 29/525; 180/300, 312; 248/562, 636, 638
See application file for complete search history.

(56) References Cited

U.S. PATENT DOCUMENTS

| 6,036,183 A | * | 3/2000 | Lee et al. ............... 267/140.14 |
| 6,250,616 B1 | * | 6/2001 | Suzuki et al. .......... 267/140.13 |
| 6,311,963 B1 | * | 11/2001 | Suzuki et al. .......... 267/140.13 |
| 6,311,964 B1 | | 11/2001 | Suzuki |

FOREIGN PATENT DOCUMENTS

| JP | 55-126158 A | 9/1980 |
| JP | 2-128843 | 10/1990 |
| JP | 2000-346120 A | 12/2000 |

* cited by examiner

Primary Examiner—Melanie Torres
(74) Attorney, Agent, or Firm—Westerman, Hattori, Daniels & Adrian, LLP.

(57) ABSTRACT

An anti-vibration device is provided, with which it is possible to fix securely a stirring plate and the like member to a mounting end piece of a first fitting even though made of a brittle metal, e.g. aluminum diecast and to enhance the durability of the fixing structure of the stirring plate and the like member to the first fitting. It comprises the first fitting, a second fitting, a vibration isolating base, a diaphragm, a partition body, an orifice, and a stirring plate, wherein the mounting end piece is inserted in a mounting hole of the stirring plate, thereby to receive one plate member of the stirring plate on a receiving surface portion of the mounting end piece, and a projecting portion of the mounding end piece is upset so that a peripheral wall thereof in longitudinal cross-section may be an arc profile and a marginal area of a projecting end surface on the peripheral wall side thereof may be spherical.

10 Claims, 12 Drawing Sheets

ANTI-VIBRATION DEVICE

BACKGROUND OF THE INVENTION

1. Field of the Invention

This invention relates to an anti-vibration device.

2. Description of the Related Art

For anti-vibration devices for supporting and fixing an automotive engine or transmission so as not to transmit vibrations of the engine, etc. to the vehicle body frame, a hydraulic type anti-vibration device is, for example, known.

A typical hydraulic anti-vibration device is, in general, made up of a first fitting to be mounted on an engine side, a second fitting to be mounted on a vehicle body frame side, a vibration isolating base made of rubber-like elastomer interconnecting both, a diaphragm attached to the second fitting, and a liquid-sealed chamber defined between the diaphragm and the vibration-isolating base. The liquid-sealed chamber is separated by a partition member into a first liquid chamber on the vibration isolating base side and a second liquid chamber on the diaphragm side, both the first and second liquid chambers communicating with each other through an orifice. Among such liquid-filled anti-vibration devices, the one having a stirring plate disposed rigidly to a mounting end of the first fitting within the first liquid chamber is known.

According to this hydraulic anti-vibration device, a liquid fluidization effect (resonance action) between the first and the second liquid chambers by the orifice and a vibration deadening effect of the vibration-isolating base permit to perform a vibration damping function and a vibration insulating function. Further it is also possible to resonate the liquid passing through the orifice defined between an outer peripheral edge of the stirring plate and an inner peripheral surface of the first liquid chamber (the vibration isolating base) in a high frequency region, to exhibit a low dynamic spring constant in the high frequency region.

A conventional expedient for fixing the stirring plate to a mounting end piece of a first fitting is disclosed in JP Patent Application Publication No. 2000-346120 A. According to this Reference, the mounting end piece of the first fitting is inserted in a mounting hole of the stirring plate, with one plate surface thereof received on a stepped portion formed on the mounting end piece; a projecting portion of the mounting end piece protruding out of the mounting hole is crushed in a riveted form and brought into pressure contact with the other plate surface of the stirring plate, whereby the stirring plate is fixed to the mounting end piece.

In recent years a reduction in weight of hydraulic anti-vibration devices is requested, and a current trend is that the first fitting is formed with a metal such as aluminum diecast. In the case where the first fitting is thus formed with diecast aluminum or the like metal, because of brittleness of the first fitting, a problem arose in that when the projecting portion was crushed in a rivet form by means of a pressing tool according to the conventional fixing expedient, an overhang part of the projecting portion (an overhang of the rivet head) being in pressure contact with the aforesaid other surface of the stirring plate was fractured.

Further problem was that even if the overhang part was not collapsed when crushed, after the stirring plate was assembled together with other members into the hydraulic anti-vibration device, the overhang of the projecting portion being in press contact with the other surface of the stirring plate was collapsed because of shortage of strength and the stirring plate came off from the first fitting.

SUMMARY OF THE INVENTION

The present invention has been made to solve the problems stated above, and it is an object of the invention to provide an anti-vibration device, with which it is possible to fix securely a stirring plate and other accessory members to a mounting end piece of a first fitting even though the first fitting is formed of a brittle metal such as diecast aluminum and to enhance the durability of the fixing structure of the stirring plate, etc. to the first fitting.

In order to attain the foregoing object, the anti-vibration device of the invention comprises a first fitting having a mounting end piece, a second fitting, a vibration isolating base connecting the first fitting and the second fitting and made of a rubber-like elastomer, and a fixed plate member fixed to the mounting end piece of the first fitting protruding from the vibration isolating base, wherein the mounting end piece includes a receiving surface portion for receiving thereon one plate surface of the fixed plate member and a projecting portion protruding from the receiving surface portion, the fixed plate member having a mounting hole, through which to insert the projecting portion of the mounting end piece; the projecting portion of the mounting end piece is constructed so that the projecting portion is inserted in the mounting hole of the fixed plate member thereby to receive the one plate surface of the fixed plate member on the receiving surface portion of the mounting end piece and concurrently, part of the projecting portion protruding from the mounting hole is upset and configured such that a peripheral wall, in longitudinal cross-section, of the projecting portion assumes such an arc profile that as the peripheral wall approaches a projecting end surface, it is located more radially outwardly and a marginal area of the projecting end surface on the peripheral wall side assumes a convex spherical form in the projecting direction, and so that the projecting portion of the mounting end piece fixed to the fixed plate member is not in pressure contact with the other plate surface of the fixed plate member.

According to this construction, because the projecting portion is upset so that the peripheral wall of the mounting end piece protruding out of the mounting hole assumes an arc shape in longitudinal cross-section such that the projecting end surface side of the projecting portion is located more radially outwardly and the peripheral wall side, marginal area of the projecting end surface assumes a convex spherical form in the projecting direction, a force applied to the projecting portion upon upsetting is smaller than the conventional technique for crushing the projecting portion in a riveted manner to upset it. As a result, it is possible to suppress that the projecting portion is collapsed upon upsetting even if the first fitting is made of a brittle metal such as aluminum diecast.

With the conventional construction wherein the projecting portion is crushed in a riveted form, the overhang part of the projecting portion being in pressure contact with the other surface of the fixed plate member is curved in a normal angle to the axis center of the projecting portion, and consequently, when a load such as hydraulic pressure is applied to the fixed plate member, a stress is apt to concentrate on the vicinity of a root of the overhang part. On the contrary, according to the aforementioned construction of this invention, the force applied to the projecting portion can be received on the curved surface of the peripheral wall of the projecting portion, whereby it is possible to make it easy to disperse the force over the entirety of the projecting portion. Further because the marginal area of the projecting end surface on the peripheral wall side is configured in a convex spherical form in the projecting direction, it is possible to make an angle at the boundary between the peripheral wall of the projecting portion and the projecting end surface, namely the angle made by the peripheral wall and the marginal area of the projecting end surface in longitudinal cross-section larger, thus elevating the durability at the boundary.

Because of these effects above, it is possible to prevent the projecting portion of the mounting end piece from being collapsed after the fixed plate member is assembled with other members into the anti-vibration device, and to avoid that the fixed plate member comes off from the first fitting.

The anti-vibration device may be further constructed so that the projecting portion of the mounting end piece is provided with a hole formed concentrically with the projecting portion and opening on the projecting end surface side, and the projecting portion is subjected to upsetting working so that the fixed plate member may be fixed to the mounting end piece of the first fitting.

The anti-vibration device may still further comprise a diaphragm attached to the second fitting to form a liquid-sealed chamber between it and the vibration isolating base, a partition member separating the liquid-sealed chamber into a first liquid chamber on the vibration-isolating base side and a second liquid chamber on the diaphragm side, an orifice bringing the first liquid chamber and the second chamber into communication with each other, and a liquid filled in the liquid-sealed chamber, the mounting end piece of the first fining being located within the first liquid chamber, the fixed plate member being fixed to the mounting end piece of the first fitting and constituted as a stirring plate forming an orifice on the first liquid chamber side between an outer peripheral edge of the mounting end piece and an inner peripheral surface of the vibration isolating base.

The anti-vibration device may still further comprise a diaphragm attached to the second fitting to form a liquid-sealed chamber between it and the vibration isolating base, a partition member separating the liquid-sealed chamber into a first liquid chamber on the vibration isolating base side and a second liquid chamber on the diaphragm side, an orifice bringing the first liquid chamber and the second chamber into communication with each other, and a liquid filled in the liquid-sealed chamber, the mounting end piece of the first fitting being located within the first liquid chamber, the fixed plate member being fixed to the mounting end piece of the first fitting and constituted as a stirring plate forming an orifice on the first liquid chamber side between an outer peripheral edge of the mounting end piece and an inner peripheral surface of the vibration isolating base.

The anti-vibration device may further be constructed so that the mounting hole of the fixed plate member is provided with a receiving portion for accommodating an extra fillet fraction produced when the projecting portion of the mounting end piece is upset, the extra fillet fraction received in the receiving portion of the mounting hole serving as a whirl-stop or detent for the fixed plate member against the mounting end piece.

The anti-vibration device may still further be constructed so that the mounting hole of the fixed plate member is provided with a receiving portion for accommodating an extra fillet fraction produced when the projecting portion of the mounting end piece is upset, the extra fillet fraction received in the receiving portion of the mounting hole serving as a whirl-stop for the fixed plate member against the mounting end piece.

The anti-vibration device may be further constructed so that the mounting hole of the fixed plate member is provided with a receiving portion for accommodating an extra fillet fraction produced when the projecting portion of the mounting end piece is upset, the extra fillet fraction received in the receiving portion of the mounting hole serving as a whirl-stop for the fixed plate member against the mounting end piece.

The anti-vibration device may still be further constructed so that the mounting hole of the fixed plate member is constituted as a round hole assuming a generally circular form as viewed in front face; the round hole is defined on its inner periphery with a plurality of recessed portions for accommodating the extra fillet fraction so that the respective recessed portions are spaced nearly equidistantly apart from one another in the direction along an arc of the round hole; and the projecting portion of the mounting end piece is constructed as a columnar body having a somewhat smaller diameter than an inside diameter of the mounting hole of the fixed plate member.

The anti-vibration device may be further constructed so that the mounting hole of the fixed plate member is constituted as such a configuration that part of the round hole in a generally circular form as viewed in front face is connected with a rectilinear line; the projecting portion of the mounting end piece is constructed as a columnar body having such an outside diameter that enables a rotation thereof in the mounting hole of the fixed plate member; the projecting portion of the mounting end piece is constructed, when inserted in the mounting hole, so that an unoccupied residual space within the mounting hole constitutes the receiving portion for the extra fillet fraction.

The anti-vibration device may also be constructed so that the mounting hole of the fixed plate member is constructed as a generally elliptic hole as viewed in front face; and the projecting portion of the mounting end piece is constructed as a columnar body having an outside diameter enabling a rotation of the projecting portion within the mounting hole of the fixed plate member so that when the projecting portion is inserted in the mounting hole, an unoccupied residual space within the mounting hole may assume the receiving portion for accommodating the extra fillet fraction.

According to the anti-vibration device of the present invention, the fixed plate member can be securely fixed to the mounting end piece of the first fitting even if the first fitting is formed of a brittle metal, e.g., aluminum diecast, and consequently, the advantageous effect is attained that durability of the fixing structure of the fixed plate member to the first fitting can be enhanced.

According to the anti-vibration device of the present invention, an additional effect to the effect attained by the anti-vibration device may be achieved in that because the projecting portion of the mounting end piece has the hole formed concentrically with the projecting portion and opening on the projecting end surface side, the force required for upsetting the projecting portion can be diminished, enabling a reduction in working cost and the projecting portion is rendered susceptible of deformation, thereby enabling a stable upsetting working of the projecting portion.

According to the anti-vibration device of the present invention, a further effect may be obtained in that because the fixed plate member fixed to the mounting end piece of the first fitting is constituted as a stirring plate, it is possible to suppress the stirring plate from being detached from the mounting end piece, even if a load such as a hydraulic pressure is exerted on the stirring plate (fixed plate member), or the generation of jolting, as a result of which it is possible to exhibit stably the liquid fluidization effect by the orifice on the first liquid chamber side.

According to the anti-vibration device of the present invention, an additional effect may be achieved in that because the fixed plate member fixed to the mounting end piece of the first fitting is constituted as a stirring plate, it is possible to suppress that the stirring plate will be detached from the mounting end piece even though a load such as hydraulic pressure is exerted on the stirring plate (fixed plate member), or jolting is generated, as a result of which it is possible to exhibit stably the liquid fluidization effect by the orifice on the first liquid chamber side.

According to the anti-vibration device of the present invention, an additional effect may be attained in that because the mounting hole has the receiving portion constructed so as to receive therein the extra fillet fraction of the projecting portion produced upon upsetting, it is possible to perform a reliable whirl-stop or detent action of the fixed plate member.

Therefore, it is possible to suppress the trouble as encountered in the case of the conventional anti-vibration device having no detent means for the fixed plate member that the fixed part is torn by swiveling of the fixed plate member and a jolting is generated. As a result, detaching of the fixed plate member or generation of noise or abnormal sound due to jolting of the fixed plate member can be precluded.

Further since the extra fillet fraction produced upon upsetting is constructed to serve as a whirl-stop (detent) of the fixed plate member, it is possible to conduct simultaneously a first work of fixing the fixed plate member to the mounting end piece and a second work of stopping of swiveling of the fixed plate member to the mounting end piece by a single upsetting work of the projecting portion. As a consequence, it is possible to make the work efficient to reduce the working cost.

According to the anti-vibration device of the present invention, an additional effect may be achieved in that because a plurality of the recessed portions as a receiving portion are provided on the inner periphery of the mounting hole (round hole) so as to accommodate the extra fillet fraction produced upon upsetting, it is possible to ensure the detent action of the fixed plate member by the extra fillet fraction received in the respective recessed portions.

Further because a plurality of the recessed portions are spaced apart to be disposed roughly equidistantly in the direction along the arc of the round hole, it is possible to introduce securely and smoothly the extra fillet fraction produced upon upsetting of the projecting portion within the recessed portions thereby performing securely the swivel stopping action of the fixed plate member. By the equidistant arrangement of the recessed portions, the load applied to the extra fillet fraction in the respective recessed portions is dispersed, making it possible to avoid a concentration of the load on the extra fillet fraction in one of the recessed portions and as such, durability is enhanced.

Again, because the projecting portion of the mounting end piece is constituted as a columnar body having a somewhat smaller diameter than the inside diameter of the mounting hole of the fixed plate member, when the projecting portion is inserted in the mounting hole of the fixed plate member, no positioning of relative rotational positions of both members is needed and the insertion work is facilitated. The assembling work of both members is thus simplified, enabling a reduction in the assembling cost to the extent that it is possible to curtail the product cost as a whole anti-vibration device.

According to the anti-vibration device of the present invention, an additional effect may be achieved in that because the mounting hole of the fixed plate member is constituted in such a configuration that a part of the round hole in roughly circular form as viewed in front face is connected by a straight line and the remaining unoccupied space of the mounting hole when the projecting portion of the mounting end piece is inserted therein is constituted as a receiving portion for accommodating the extra fillet fraction produced upon upsetting, it is possible to securely perform the swirl stopping action of the fixed plate member by means of the extra fillet fraction accommodated in the receiving portion.

Further because the projecting portion of the mounting end piece is constituted as a columnar body having an outside diameter enabling a swiveling of the fixed plate member in the mounting hole, positioning of both members in relative rotational directions when inserting the projecting portion into the mounting hole of the fixed plate member is unnecessary to conduct, thus facilitating the insertion work. The assembling cost can be therefore curtailed by simplifying the assembling work in this manner, which decrement enables a reduction in product cost as a whole anti-vibration device.

According to the anti-vibration device of the present invention, an additional effect may be achieved, wherein because the mounting hole of the partition plate member is constituted as a generally elliptic hole as viewed from the top face and the remaining unoccupied space in the mounting hole when the projecting portion of the mounting end piece is inserted is constituted as a receiving portion for the extra fillet fraction produced upon upsetting, it is possible to ensure stopping of swiveling of the fixed plate member by the extra fillet fraction thus received.

Further because the projecting portion of the mounting end piece is constructed as a columnar body having an outside diameter enabling a swiveling of the fixed plate member in the mounting hole, it is unnecessary to conduct positioning of both members in relative rotational directions when inserting the projecting portion into the mounting hole of the fixed plate member, thus facilitating the insertion work. Therefore the assembling cost can be diminished by simplification of the assembling work, which decrement enables a reduction in product cost as a whole anti-vibration device.

DESCRIPTION OF THE PREFERRED EMBODIMENTS

Figure 1:
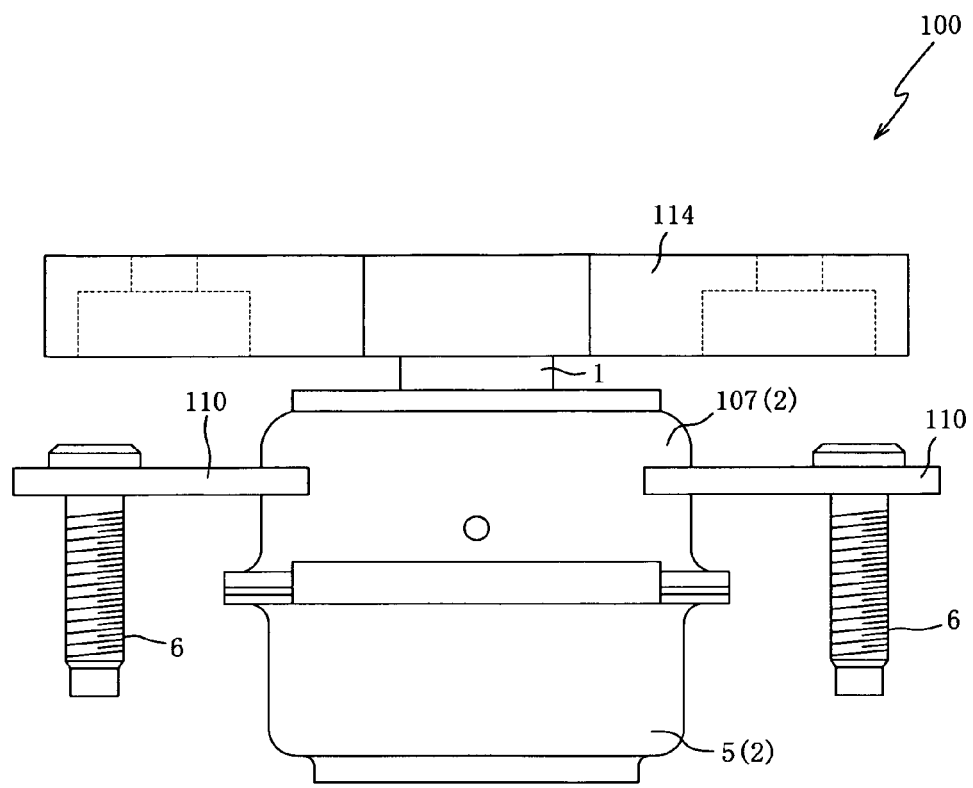
FIG. 1 is a front elevation of a hydraulic anti-vibration device in a first embodiment of the invention.
Figure 2:
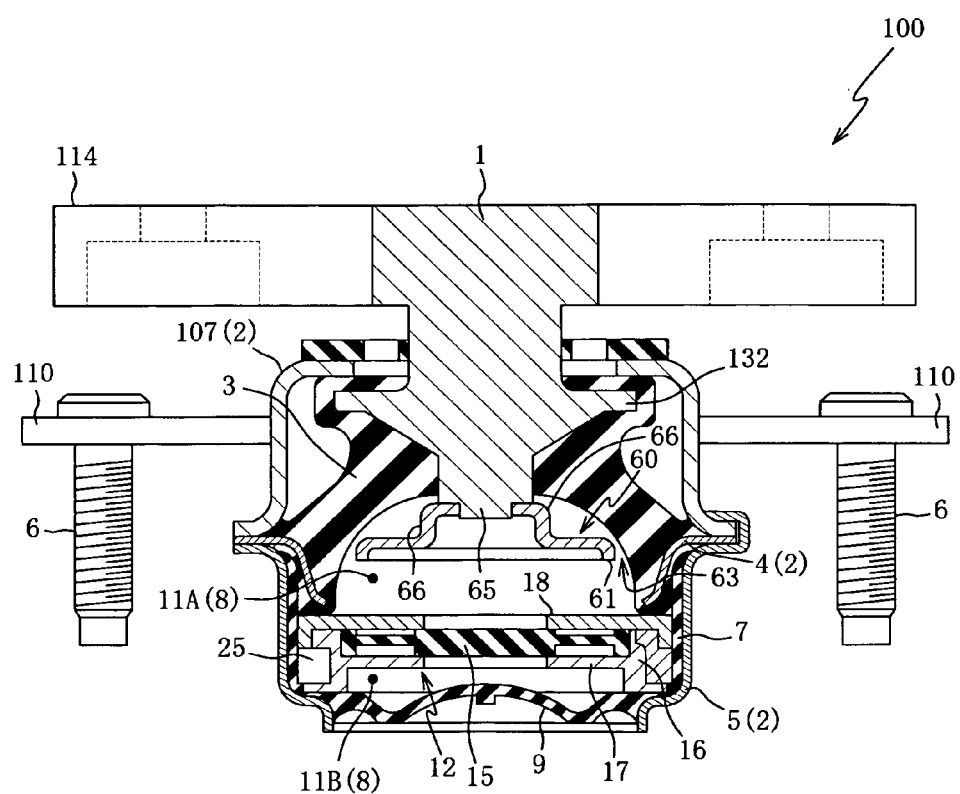
FIG. 2 is a longitudinal sectional view of the anti-vibration device in the preceding figure.

The preferred embodiments of this invention will be hereinafter described with reference to the accompanying drawings. Referring to FIGS. 1 and 2, a first embodiment of a hydraulic anti-vibration device 100 of this invention will be described, wherein the anti-vibration device 100 is applied to FR type (front engine/rear wheel drive) automobiles.

This hydraulic anti-vibration device 100 is made up of a first fitting 1 mounted on a transmission through a bracket 114, a cylindrical second fitting 2 mounted on a vehicle body side member, and a vibration isolating base 3 made of a rubber-like elastomer interconnecting these two.

The first fitting 1 is made of a diecast aluminum and configured in a stepped columnar shape having a flange-like stopper portion 132, with its top end connected to the bracket 114.

The second fitting 2 includes a cylindrical fitting 4 to which the vibration isolating base 3 is molded by vulcanization, a cylindrical bottom fitting 5, and a cylindrical stopper fitting 107 covering the vibration isolating base 3 and the stopper portion 132. These three members (4, 5, 107) are situated concentrically with one another and integrally fixed at respective flange portions on axially one end sides of them by crimping.

The stopper fitting 107 serves to suppress displacement amounts of the first fitting 1 and the second fitting 2 within a predetermined range. At the stopper fitting 107 there is formed a mounting face part 110 as a coupling means to the vehicle body side member in an overhanging manner, to which a plurality of mounting bolts 6 (2 pieces in this example) are rigidly press fitted.

The vibration isolating base 3 is configured in a conical frustum shape, with the bottom side being hollow and vulcanization bonded to the first fitting 1 and the cylindrical fitting 4, respectively, at its upper end surface and its lower end part.

At the bottom of the bottom fitting 5, a diaphragm 9 made of a rubber membrane is cure molded, forming a chamber 8 for a sealing liquid between the diaphragm 9 and the underside of the vibration isolating base 3. In the chamber 8 a liquid is filled and sealed. And a partition body 12 dividing the liquid-sealed chamber 8 into a first liquid chamber 11A on the vibration isolating base side and a second liquid chamber 11B on the diaphragm side is fixed so as to be pinched between the bottom part of the bottom fitting 5 and the bottom part of the cylindrical fitting 4.

The partition body 12 includes a disc-like resilient partition membrane 15 made of rubber, a cylindrical member 16 accommodating the resilient partition membrane 15 to bear it on a first displacement regulating member 17 provided integrally with an inner peripheral surface thereof, and a second displacement regulating member 18 covering an opening of the cylindrical member 16 on one end surface side thereof.

Between the outer peripheral surface of the cylindrical member 16 and a rubber membrane 7 vulcanization molded to the inner peripheral surface of the bottom fitting 5, there is defined an orifice 25 bringing the first liquid chamber 11A and the second liquid chamber 11B into communication with each other. The orifice 25 communicates with the first liquid chamber 11A via a first communication hole (not shown) of the second displacement regulating member 18 and an upper cutout (not shown) and with the second liquid chamber 11B via a lower cutout (not shown) of the cylindrical member 16.

Within the first liquid chamber 11A, a disc-shaped stirring plate 60 is provided, defining an orifice 63 on the first liquid chamber side between an outer peripheral edge 61 of the stirring plate 60 and the inner peripheral surface of the first liquid chamber 11A (the vibration isolating base 3).

A coupling portion 66 of the stirring plate 60 on its central side is connected to a mounting end piece 65 of the first fitting 1 protruding into the first liquid chamber 11A. The coupling portion 66 swells out upwardly in a cylindrical form.

Now the attachment construction of the stirring plate 60 to the mounting end piece 65 of the first fitting 1 will be described with reference to FIGS. 3 to 5.

Figure 3:
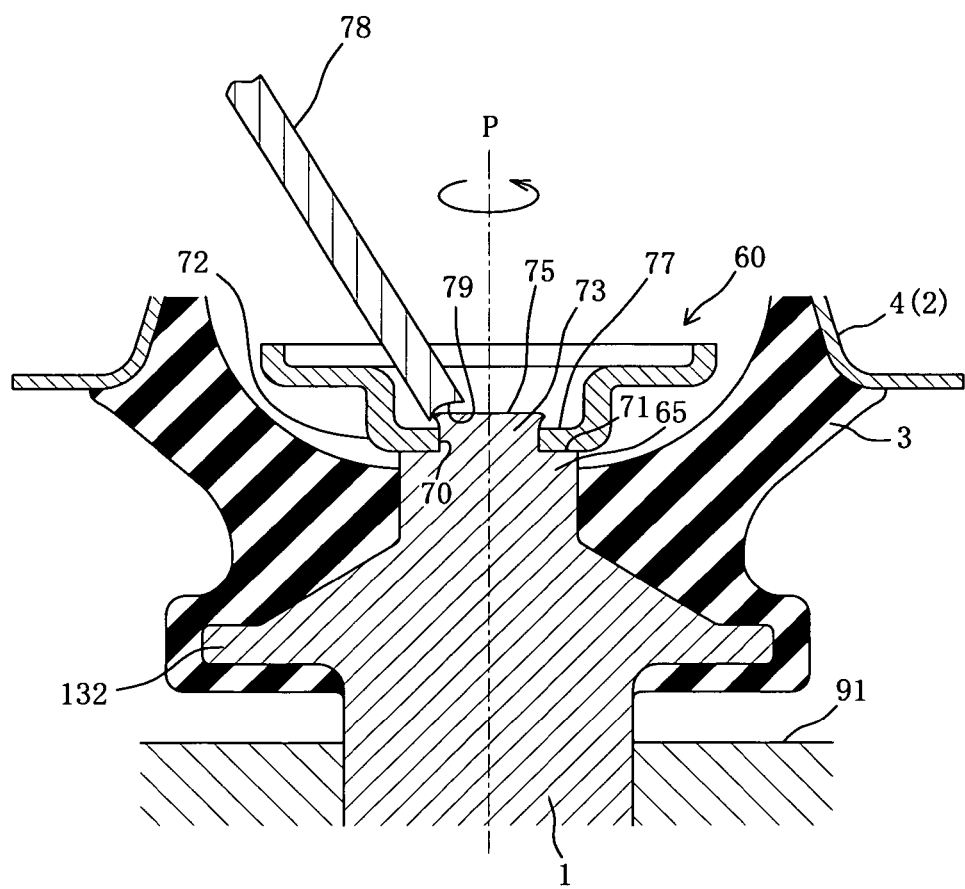
FIG. 3 is a longitudinal sectional view representing a fixing method of a stirring plate to a mounting end piece of a first fitting in the first embodiment, which illustrates an upsetting working of a projecting portion by means of a pressure tool.
Figure 4:
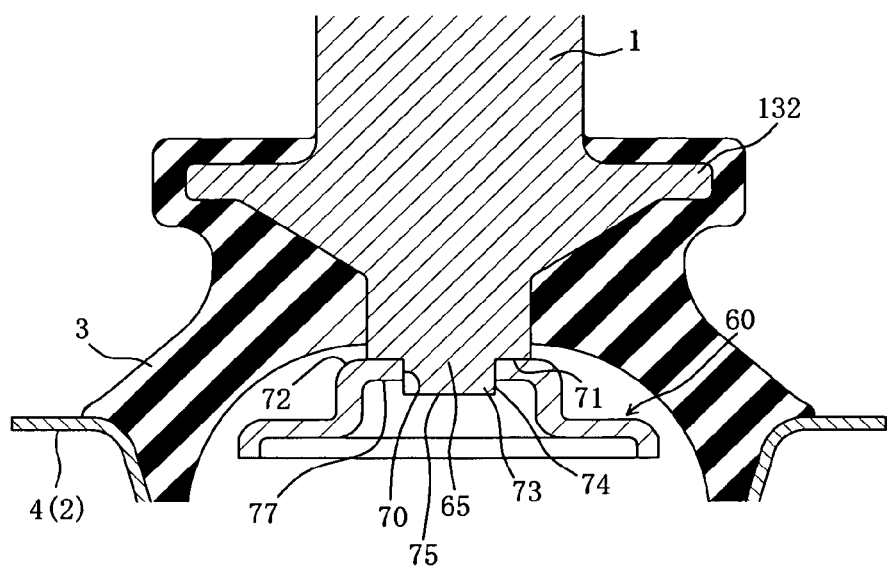
FIG. 4 is likewise a longitudinal sectional view illustrating the fixing way of the stirring plate to the mounting end piece of the first fitting, in the state prior to the upsetting working of the projecting portion.
Figure 5:
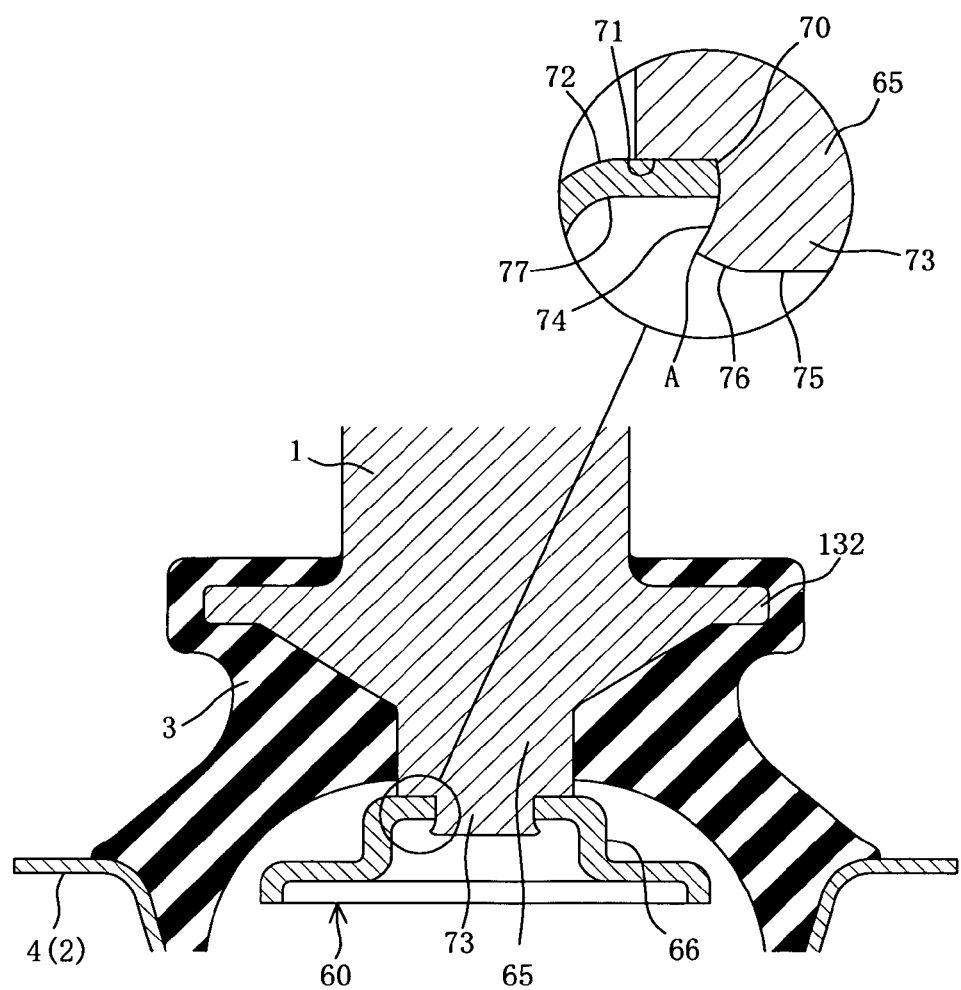
FIG. 5 is likewise a longitudinal sectional view illustrating the fixing way of the stirring plate to the mounting end piece of the first fitting, in the state after the upsetting working of the projecting portion.

FIGS. 3 to 5 are longitudinal sectional views indicating the fixing technique of the stirring plate 60 to the first fitting 1. FIG. 3 illustrates the upsetting working of a projecting portion 73 by means of a pressure tool 78, FIG. 4 indicates a state of the projecting portion 73 prior to the upsetting working, and FIG. 5 indicates a state of the projecting portion 73 after the upsetting working.

As shown in FIG. 5, the mounting end piece 65 in a round rod form of the first fitting 1 is inserted in a round mounting hole 70 formed in a center of the coupling portion 66 of the stirring plate 60, concurrently with which the one plate surface 72 of the stirring plate 60 is received on a stepped receiving surface portion 71 (a step) formed on the mounting end piece 65.

And the projecting portion 73 is subjected to upsetting so that a peripheral wall 74, in longitudinal sectional profile, of the projecting portion 73 of the mounting end piece protruding out of the mounting hole 70 may be configured in such an arc form that a projecting end surface 75 side thereof is located more radially outwardly and a marginal area 76 on the peripheral wall 74 side of the projecting end surface 75 may assume a concave spherical form in the projecting direction, whereby the stirring plate 60 is fixed to the mounting end piece 65 without bringing the projecting portion 73 into pressure contact with the other plate surface 77 of the stirring plate 60.

The fixing procedure of the stirring plate 60 to the mounting end piece 65 of the first fitting 1 is conducted as follows:

[1] After the vibration isolating base 3 is cure molded to the first fitting 1 and the cylindrical fitting 4 and before the first fitting 1 and the cylindrical fitting 4 are fixed to the bottom fitting 5 by crimping, the first fitting 1 is mounted on a support stand 91 as shown in FIG. 3.

Then the mounting end piece 65 of the first fitting 1 (the projecting portion 73) is inserted in the mounting hole 70 of the stirring plate 60 to receive the one plate surface 72 of the stirring plate 70 on the receiving surface portion 71 of the mounting end piece 65.

In the first embodiment, the projecting portion 73 of the mounting end piece 65 protruding out of the mounting hole 70 has an axial length (a length between the projecting end surface 75 and the other end surface 77 of the stirring plate 60) of ca. 2 mm and a diameter of ca. 9.85 mm.

[2] The pressure tool 78 is forced onto the projecting end surface 75 of the projecting portion 73, with its partly spherical, shallow dented press-action part 79 contacting with the projecting end surface, and a pressure drive mechanism (not shown) is driven to rotate the rod-like pressure tool 78 in a manner drawing a conical (or substantially conical) locus around an axis line P of the projecting portion 73, thereby conducting upsetting working of the projecting portion 73.

By this upsetting, the projecting portion 73 is extended in diameter from a straight profile state prior to working as shown in FIG. 4, to the state that the peripheral wall 74 assumes such an arc form as shown in FIG. 5 that the longitudinal sectional profile of the projecting end surface 75 side is located radially outwardly and the marginal area 76 of the projecting end surface 75 on the peripheral wall 74 side assumes a convex spherical form in the projecting direction.

Here, the diameter at a junction A between the lowermost end of the peripheral wall 74 and the peripheral area 76 of the projecting end surface 75 takes a maximum diameter of the projecting portion 73. In the first embodiment, this maximum diameter is ca. 11.5 mm.

Next a second embodiment will be described with reference to FIGS. 6 and 7. In the first embodiment above, the projecting portion 73 is constructed to be solid in its central part whereas in the second embodiment, the projecting portion 73 is recessed with a hole 90, with its central part being hollow. In the second embodiment, the parts similar to those in the first embodiment are designated by like reference numerals, and detailed description of them will be therefore omitted.

Figure 6:
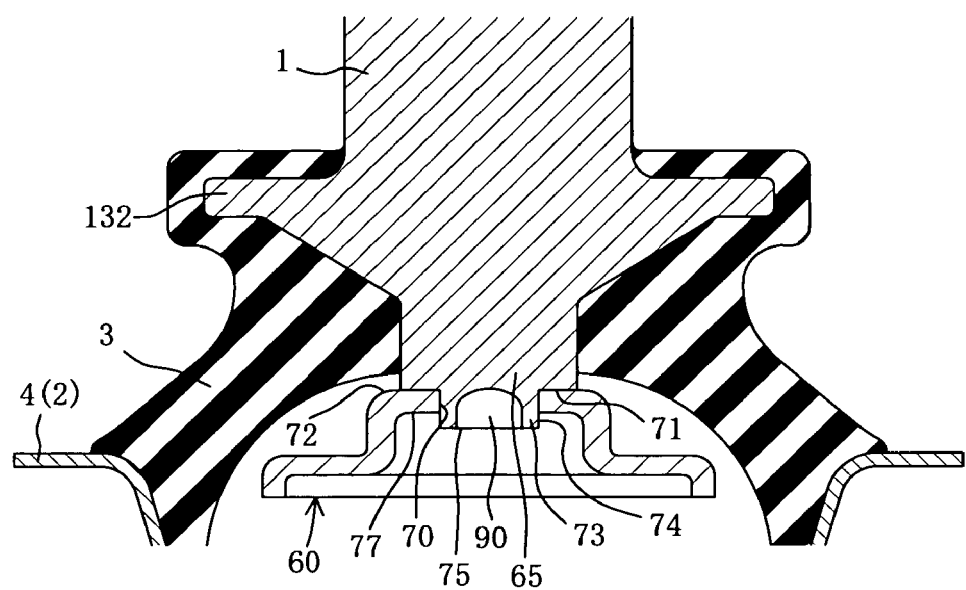
FIG. 6 is a longitudinal sectional view showing the fixing way of the stirring plate to the mounting end piece of the first fitting in a second embodiment, which illustrates the state prior to the upsetting working of the projecting portion.
Figure 7:
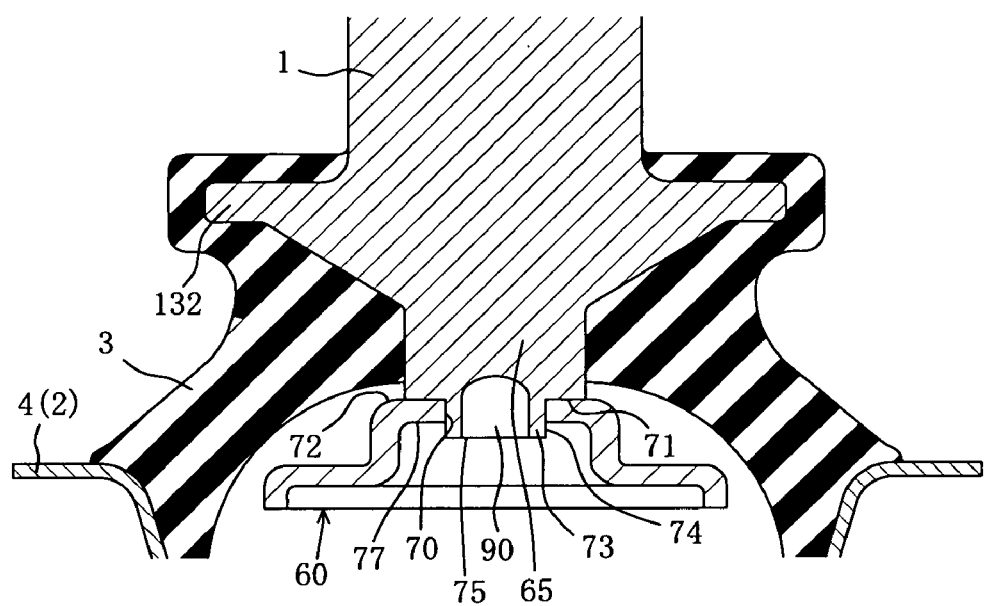
FIG. 7 is a longitudinal sectional view showing the fixing way of the stirring plate to the mounting end piece of the first fitting in a second embodiment, which illustrates the state prior to the upsetting working of the projecting portion.

FIGS. 6 and 7 indicate the fixing method of the stirring plate 60 to the mounting end piece 65 of the first fitting 1 in the second embodiment, showing the state of the projecting portion 73 prior to upsetting working.

The projecting portion 73 of the mounting end piece 65 may be first formed with the bottomed hole 90 opening on the projecting end surface 75 side and concentric with the projecting portion 73 as shown in FIGS. 6 and 7, followed by upsetting by means of the pressure tool 78.

The boring depth of the hole 90 from the projecting end surface 75 may be such that the bottom of the hole 90 is located at an approximately equal level to the receiving surface portion 71 (namely, the foot of the projecting portion 73) as shown in FIG. 6 or located to exceed over the receiving surface portion 71, as shown in FIG. 7.

A third embodiment of this invention will be described with reference to FIGS. 8 and 9. The stirring plate 160 in the third embodiment is fixed to the mounting end piece 65 of the first fitting 1 in a whirl-stopping state. Here, the parts similar to those in the embodiments above are designated by like reference numerals, and their detailed description will be omitted.

Figure 8A:
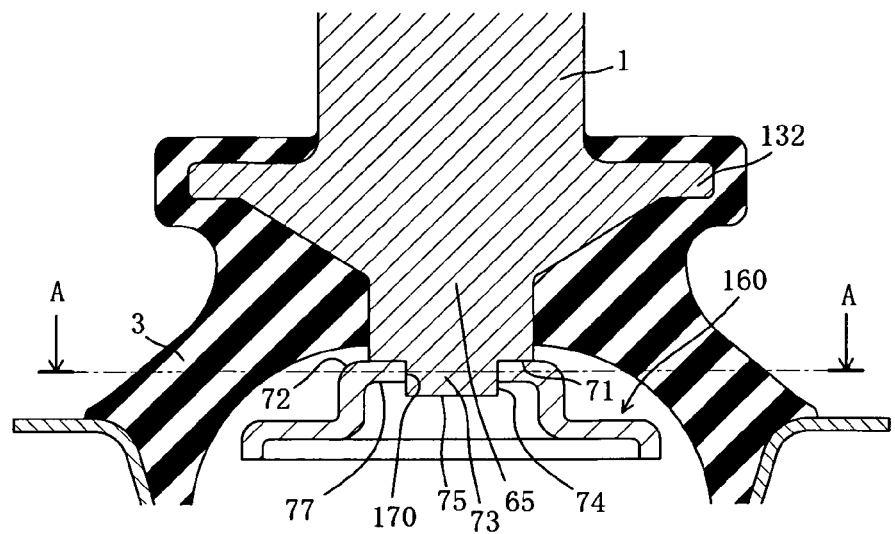
FIG. 8A and FIG. 8B are longitudinal sectional views showing the fixing way of the stirring plate to the mounting end piece of the first fitting in a third embodiment, which illustrate respectively the state prior to and the state after the upsetting working of the projecting portion.
Figure 8B:
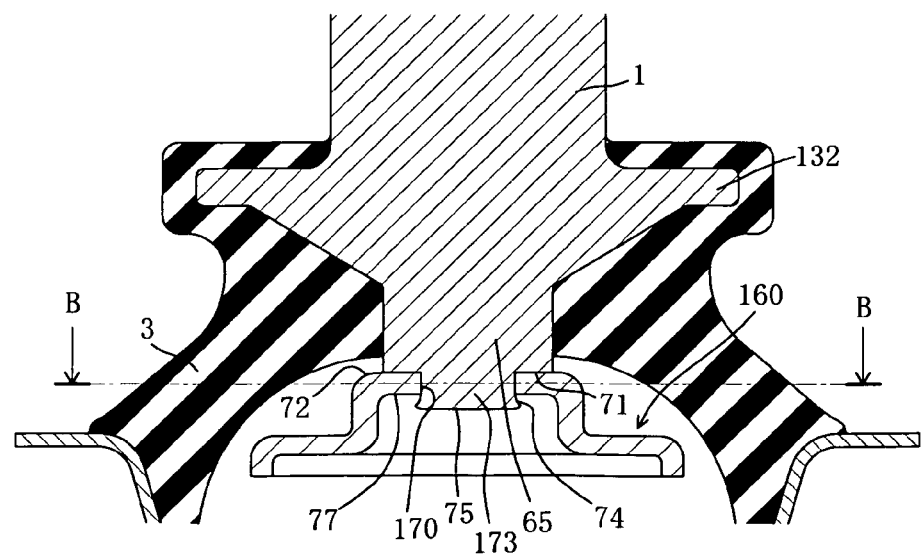

FIGS. 8A and 8B indicate the fixing method of the stirring plate 160 to the mounting end piece 65 of the first fitting 1, wherein FIG. 8A and FIG. 8B show the states of the projecting portion 73 before and after upsetting, respectively.

Figure 9A:
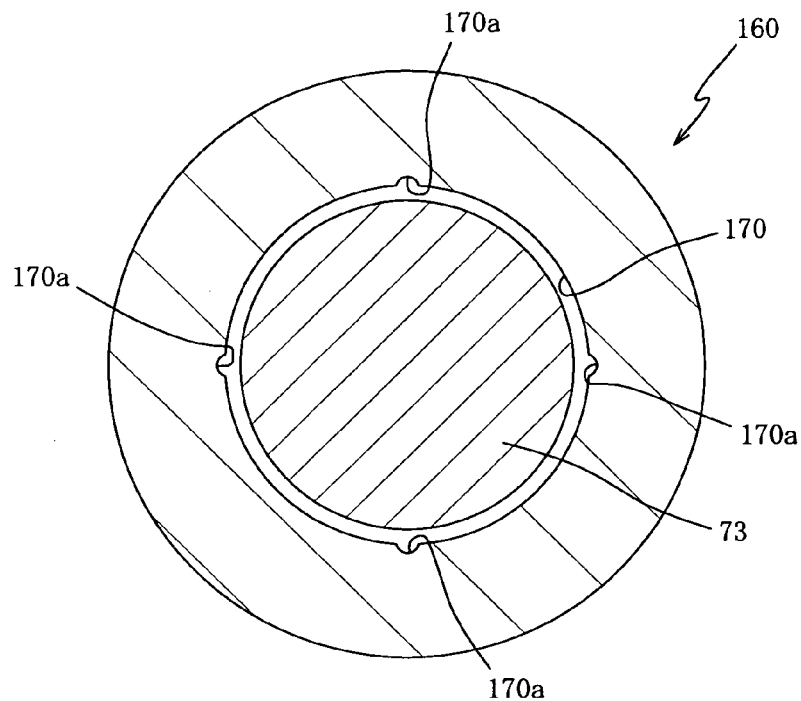
FIG. 9A and FIG. 9B are a sectional view of the projecting portion and the stirring plate taken along A—A line in FIG. 8A and a sectional view of the projecting portion and the stirring plate taken along B—B line in FIG. 8B, respectively.
Figure 9B:
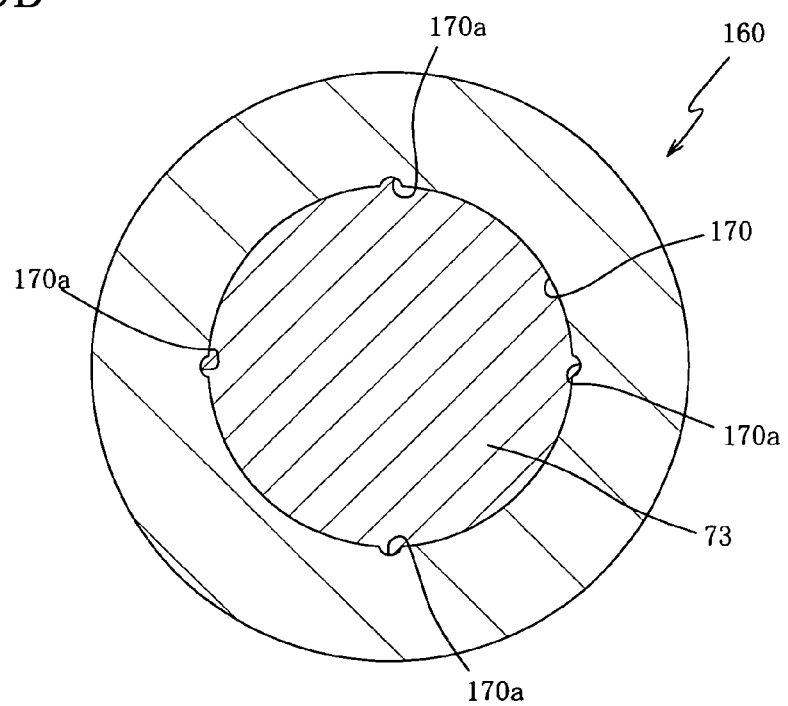

FIGS. 9A and 9B show the projecting portion 73 and the stirring plate 160 taken along A—A line and B—B line of FIGS. 8A and 8B, respectively, wherein FIG. 9A is simplified and illustrated schematically in an enlarged scale of the size of a facing distance (gap) between the projecting portion 73 and the mounting hole 170 for the sake of better understanding.

The mounting hole 170 of the stirring plate 160 in the third embodiment is defined with receiving portions (recessed portions 170a) for receiving extra fillet fraction produced upon upsetting (cf. FIG. 9A) so that the extra fillet fraction of the projecting portion 73 received in the receiving portions serves as a whirl-stop of the stirring plate 160 against the mounting end piece 65 (the projecting portion 73) (cf. FIG. 9B).

That is, when the projecting portion 73 is upset by means of the pressure tool 78 (cf. FIGS. 3 and 5), the extra fillet fraction of the projecting portion 73 produced by the upsetting working is received in the recessed portions 170a and the stirring plate 160 is retarded swiveling against the mounting end piece 65 (the projecting portion 73) of the first fitting 1.

With the conventional anti-vibration device having no whirl-stop for the stirring plate, the trouble occurred that the stirring plate, after assembled to the vehicle body, swiveled to cause abrasion of the fixed part, generating a jolting. However, according to the hydraulic anti-vibration device 100 in the third embodiment, because the stirring plate 160 is fixed in a whirl-stop state, it is possible to prevent the generation of jolting, as a result of which it is possible to preclude the detaching of the stirring plate 160 or generation of abnormal sound due to jolting of the stirring plate 160.

Further because of the constitution that the extra fillet fraction produced upon upsetting serves as a whirl-stop of the stirring plate 160, it is possible to perform simultaneously a first work of fixing the stirring plate 160 to the mounting end piece 65 and a second work of stopping the swiveling of the stirring plate 160 against the mounting end piece 65 by a single work of upsetting the projecting portion 73. As a consequence, the work can be made efficient, thereby enabling curtailment of the working cost.

More specifically, the mounting hole 170 of the stirring plate 160 is constructed as a generally round hole as viewed in front face as illustrated in FIG. 9A. The mounting hole 170 as a round hole is defined on its inner peripheral surface with a plurality of (four in the third embodiment) the recessed portions 170a as a receiving portion for the extra fillet fraction. The adjacent recessed portions 170a are spaced an approximately equal distance (ca. 90 degrees distance in the third embodiment) apart from one another in the direction along the arcs of the mounting hole 170 (namely, the circumferential direction).

The third embodiment is thus constituted so that the extra fillet fraction produced upon upsetting may be received in a plurality of the recessed portions 170a, and as such, it is possible to ensure the whirl-stop action of the stirring plate 160.

Further because each distance between the adjacent recessed portions 170a is made generally equal to one another in the direction along the arcs of the mounting hole 170 as stated above, it is possible to make the extra fillet fraction produced upon upsetting of the projecting portion 73 to be received (fluidized) securely and smoothly in respective recessed portions 170a without being concentrated on one single recessed portion 170a, thus ensuring a reliable whirl-stop action of the stirring plate 160.

Furthermore by the substantially equidistant arrangement, a load applied to the extra fillet fraction within the recessed portions 170a can be dispersed to avoid the concentration of the load on the extra fillet fraction in the single recessed portion 170a, and as such, durability can be enhanced.

The projecting portion 73 of the mounting end piece 65 is constructed as a columnar body (cf. FIG. 8) having a somewhat smaller diameter than the inside diameter of the mounting hole 170 of the stirring plate 160 as shown in FIG. 9A. When the projecting portion 73 is inserted in the mounting hole 170 of the stirring plate 160, no positioning of both members 73, 170 as to relative rotational positions is therefore needed, making it possible to conduct the inserting work easily. As a consequence, assembling cost of both members 73, 170 is reduced to the extent that the product cost of the hydraulic anti-vibration device 100 as a whole can be reduced.

Since the recessed portions 170a are configured in a concave semicircular shape in the radially outwardly as shown in FIGS. 9A and 9B, it is possible to flow (make to receive) smoothly the extra fillet fraction of the projecting portion 73 into the recessed portions 170a to fill the full volume of the recessed portions 170a by the extra fillet fraction, especially without rendering the upsetting allowance of the projecting portion 73 unnecessarily large. As a result, it is possible to ensure the whirl-stop action of the stirring plate 160 while preventing fracture of the projecting portion 73.

Another fourth embodiment will be described with reference to FIGS. 10A and 10B. Like parts similar to those in the respective embodiments above are designated by like reference numerals, and their detailed description is omitted.

Figure 10A:
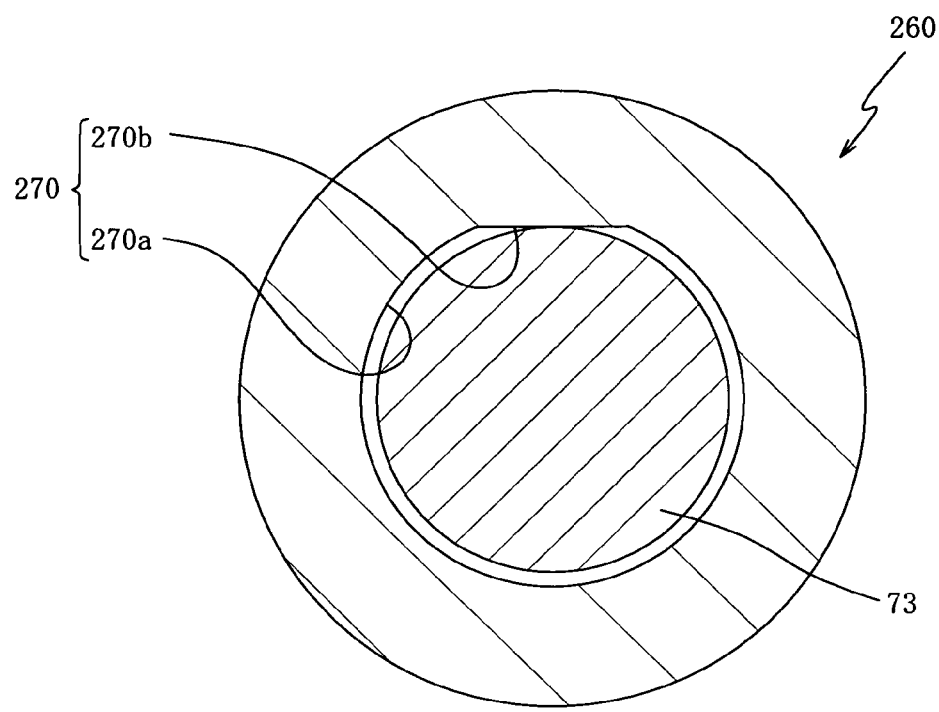
FIG. 10 is a sectional view of the projecting portion and the stirring plate in a fourth embodiment.
Figure 10B:
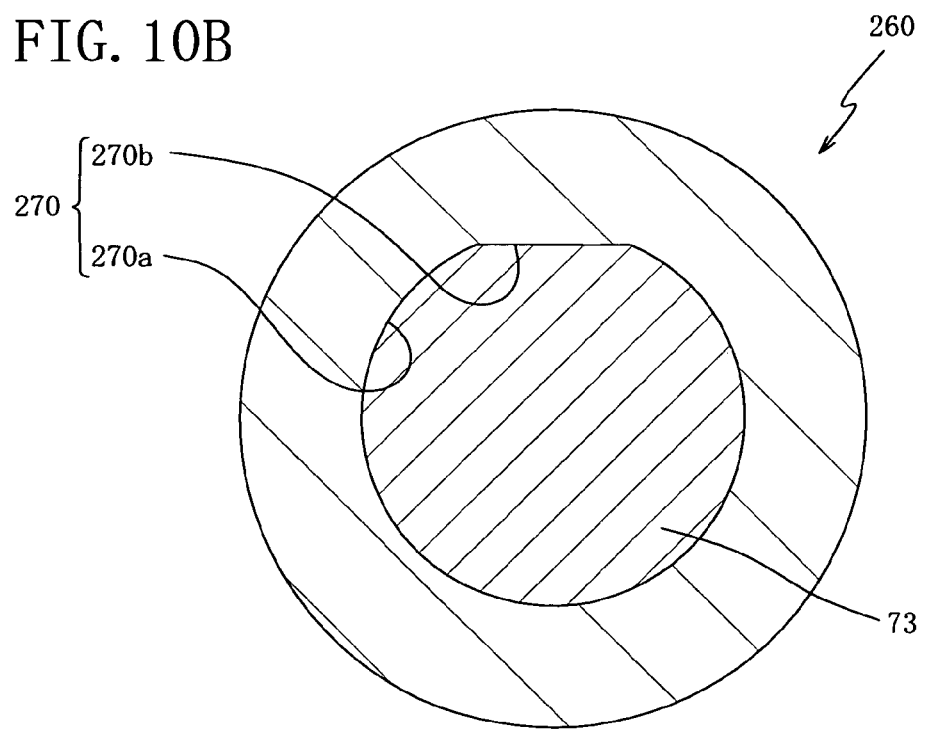

FIGS. 10A and 10B show the projecting portion 73 and a stirring plate 260 in the fourth embodiment and correspond to the sectional views taken along A—A line of FIGS. 8A and B—B line of FIG. 8B, respectively. FIG. 10A is simplified and enlarged to show schematically the size of the distance (gap) between the projecting portion 73 and the stirring plate 270 for the sake of better understanding.

According to the fourth embodiment, a mounting hole 270 of the stirring plate 260 is constructed as such a shape that a generally round hole 270a as viewed in front surface is partly connected with a straight line 270b as shown in FIGS. 10A and 10B, and simultaneously constructed so that after the projecting portion 73 is inserted in the mounting hole 270, the residual unoccupied space within the mounting hole 270 (the gap between the projecting portion 73 and the mounting hole 270) may serve as a receiving portion for the extra fillet fraction.

Stated another way, when the projecting portion 73 is subjected to upsetting from the state shown in FIG. 10A (as represented in FIG. 3), the extra fillet fraction thereof produced by the upsetting is received in the clearance gap between the projecting portion 73 and the mounting hole 270, whereby the internal space of the mounting hole 270 is filled with the extra fillet fraction, as shown in FIG. 10B. As a result, it is possible to ensure to exhibit the whirl-stop action of the stirring plate 260 by means of the extra fillet fraction so filled.

Here, the projecting portion 73 of the mounting end piece 65 is constituted as a columnar body (cf. FIG. 8) having an outside diameter in which it is capable of swiveling in the mounting hole 270 of the stirring plate 260. Consequently, when the projecting portion 73 is inserted in the mounting hole 270 of the stirring plate 260, it is possible to conduct readily the inserting work without the necessity of positioning both members 73, 270 as to relative rotational positions. The assembling cost of both members 73, 270 is thus reduced, and to that extent it is possible to diminish the cost as a whole product of the hydraulic anti-vibration device 100.

Further fifth embodiment will be described with reference to FIGS. 11A and 11B, wherein like parts similar to those in the respective embodiments above are designated by like reference numerals, and their detailed description is omitted.

Figure 11A:
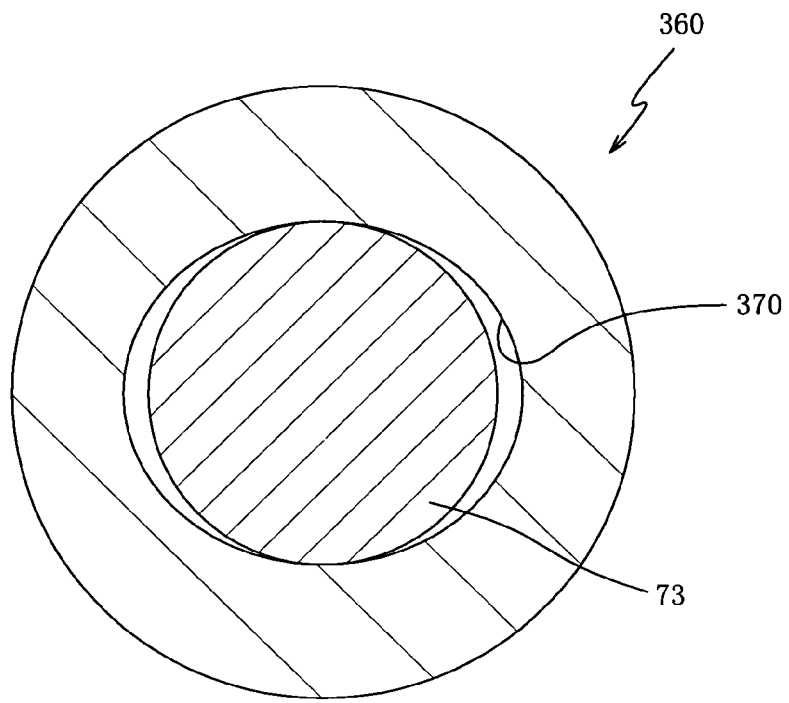
FIG. 11 is a sectional view of the projecting portion and the stirring plate in a fifth embodiment.
Figure 11B:
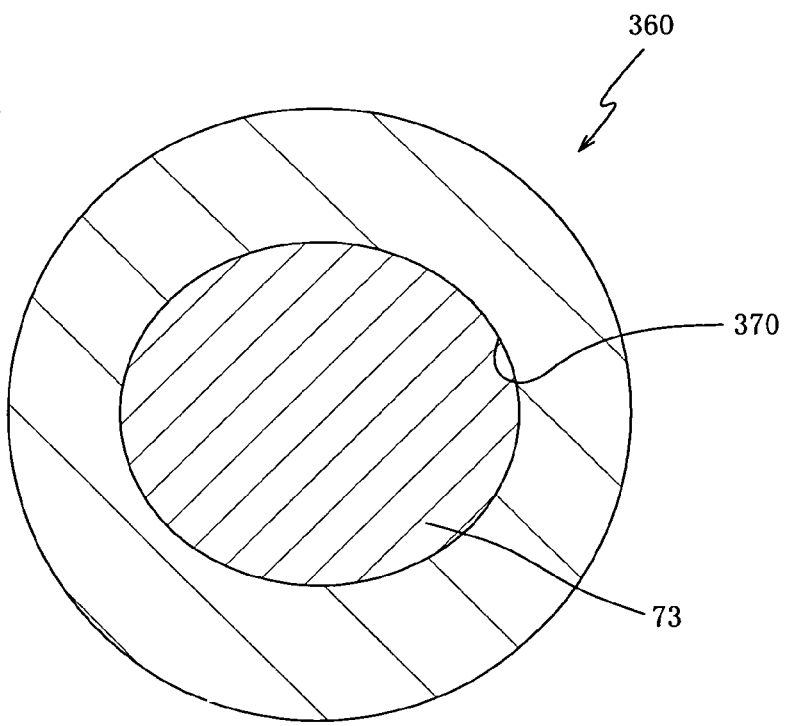

FIGS. 11A and 11B are sectional views of the projecting portion 73 and a stirring plate 360, corresponding to sectional views taken along A—A line of FIGS. 8A and B—B line of FIG. 8B, respectively. FIG. 11A is simplified and shown schematically for the sake of better understanding, with the size of the distance (gap) between the projecting portion 73 and a mounting hole 370 enlarged.

The mounting hole 370 of the stirring plate 360 in the fifth embodiment is configured as shown in FIGS. 11A and 11B in a generally elliptical hole as viewed in front surface, and concurrently is constructed so that when the projecting portion 73 is inserted in the mounting hole 370, the residual unoccupied space within the mounting hole 370 (namely, a clearance gap between the projecting portion 73 and the stirring plate 360) may serve as a receiving portion for the extra fillet fraction.

More specifically, when the projecting portion 73 is subjected to upsetting (cf. FIG. 3) from the state shown in FIG. 11A, the extra fillet fraction produced thereby is received in the clearance gap between the projecting portion 73 and the mounting hole 370, whereby the internal space of the mounting hole 370 is filled with the extra fillet fraction as shown in FIG. 11B. As a result, it is possible to secure whirl stopping of the stirring plate 360 by the extra fillet fraction thus filled.

Here, the projecting portion 73 of the mounting end piece 65 is configured as a columnar body (cf. FIG. 8) having an outside diameter capable of revolving within the mounting hole 370 of the stirring plate 360. When the projecting portion 73 is inserted in the mounting hole 370 of the stirring plate 360, it is therefore possible to facilitate the inserting work without the necessity of positioning both members 73, 370 as to their relative rotational positions. As a consequence, it is possible to reduce the assembling cost of both members 73, 370 to the extent that it is possible to reduce the product cost of the hydraulic anti-vibration device 100 as a whole.

In the following a sixth embodiment of this invention will be described with reference to FIG. 12. In the first embodiment above, the hydraulic anti-vibration device 100, to which this invention is applicable, has been described, but the sixth embodiment will be described with a case where the invention is applied to a so-called conventional type of non-hydraulic anti-vibration device 400. Like parts in the aforesaid embodiments are designated by like reference numerals, and detailed description of them is omitted.

Figure 12:
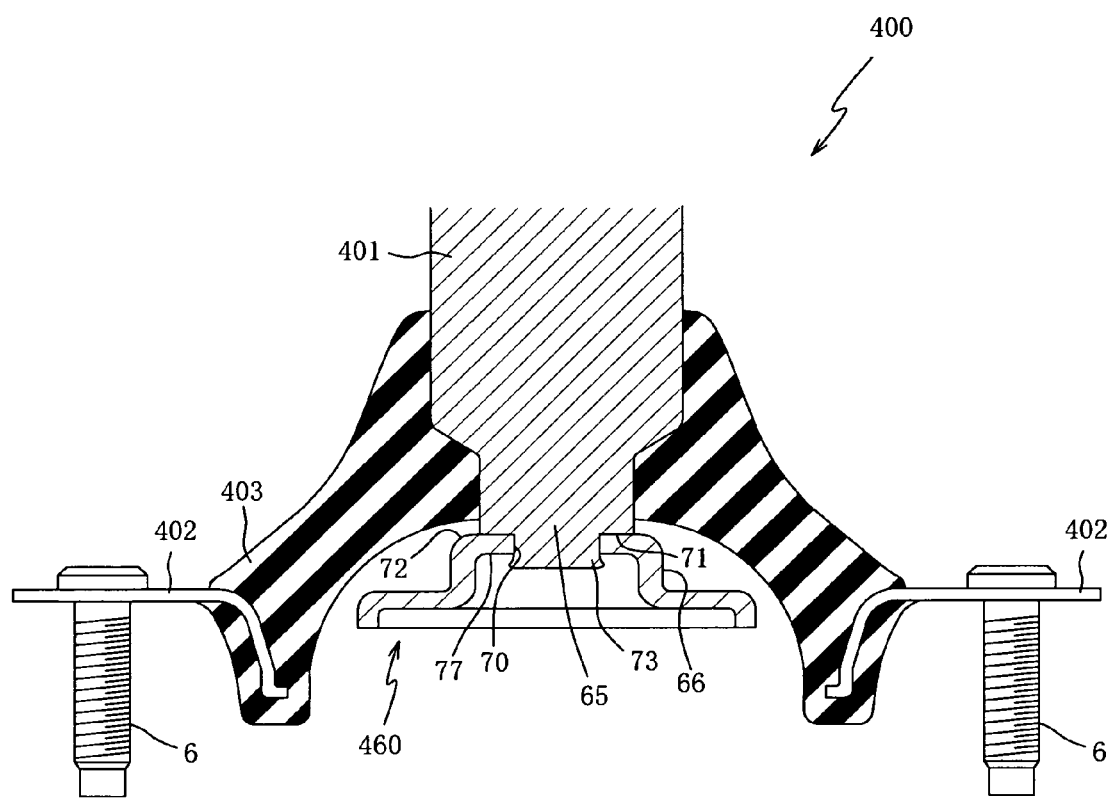
FIG. 12 is a sectional view of the projecting portion and the stirring plate in a sixth embodiment.

FIG. 12 shows a longitudinal cross-section of the anti-vibration device 400 in the sixth embodiment. This anti-vibration device 400 is made up of a first fitting 401 mounted on a transmission through a mounting bracket (not shown), a second fitting 402 mounted on a member on the vehicle body side, and a vibration isolating base 403 interconnecting both.

The first fitting 401 is made of a diecast aluminum, and the mounting end piece 65 at its lower end is formed with the receiving surface portion 71 and the projecting portion 73. These members 65, 71, 73 are constructed in a similar manner to the foregoing respective embodiments.

The vibration isolating base 403 is vulcanization bonded to the first fitting 401 and the second fitting 402, with its bottom part side configured in a hollow conical frustum-shaped form. That is, the vibration isolating base 403 is defined with a recessed space at the bottom part on the second fitting 402 side, within which a stopper member 460 is disposed.

The stopper member 406 is to perform a stopper action upon inputting of a large displacement by abutment of its outer peripheral edge onto the vibration isolating base 403, and to that end, it is fixed to the mounting end piece 65 (the projecting portion 73) of the first fitting 401 within the recessed space. The fixing way of the stopper member 460 to the mounting end piece 65 is similar to the case of the first embodiment described above, and its description is omitted, accordingly.

According to the anti-vibration device 400 in the sixth embodiment, it is unnecessary to provide it with the stopper 132 of the first fitting 1 and the stopper fitting 107 (cf. FIG. 2) as is the case with the first embodiment, and consequently, the cost of parts is reduced, thereby enabling curtailment of the product cost of the anti-vibration device 400 as a whole.

Furthermore since the stopper member 460 is fixed to the mounting end piece 65 by upsetting the projecting portion 73 as is the case with the first embodiment, it is possible to fix firmly the stopper member 460. Therefore upon inputting of a large displacement, even if the stopper member 460 abuts on the vibration isolating base 403 and is subject to a load, it is possible to suppress the fracture of the mounting end piece 65 (the projecting portion 73), detachment of the stopper member 460, or generation of jolting, as a result of which it is possible to exhibit stably a stopper action upon inputting of a large displacement.

The invention has been described so far on the basis of the embodiments, but it will be appreciated that this invention is not limited to them, but can be varied and modified without departing from the scope and gist of this invention.

In the embodiments described above, the hydraulic anti-vibration device 100 or the anti-vibration device 400 is disposed between a transmission and a vehicle body member, but this invention is not necessarily limited to that case. For example, it may be disposed between an engine and the vehicle body member.

Further, the numerical value conditions as mentioned above in the embodiments are only exemplary, and it is naturally possible to adopt another values.

Again it is, as a matter of course, possible to combine appropriately the respective embodiments above to constitute another embodiment. For instance, the hole 90 in the fourth embodiment may be combined with the whirl-stop means (receiving portion) in any one of the third to fifth embodiments.

Furthermore the mounting hole 270 in the fourth embodiment is configured in a manner such that the round hole 270a is connected with the straight line 270b, but this is not limitative, but may be constituted so that the round hole 270a is connected with a plurality of straight lines 270b.

The present invention so far described thus provides the anti-vibration device, with which even if the first fitting is constructed of a brittle metal such as diecast aluminum, the stirring plate and other members can be fixed so securely to the mounting end piece of the first fitting that it is possible to enhance the durability of the fixing structure of the stirring plate and other members to the first fitting.

What is claimed is:

1. An anti-vibration device comprising a first fitting having a mounting end piece, a second fitting, a vibration isolating base connecting the first fitting and the second fitting and made of a rubber-like elastomer, and a fixed plate member fixed to the mounting end piece of the first fitting protruding from the vibration isolating base,
wherein the mounting end piece includes a receiving surface portion for receiving thereon one plate surface of the fixed plate member and a projecting portion protruding from the receiving surface portion, the fixed plate member having a mounting hole, through which to insert the projecting portion of the mounting end piece;
the projecting portion of the mounting end piece is constructed so that the projecting portion is inserted in the mounting hole of the fixed plate member thereby to receive the one plate surface of the fixed plate member on the receiving surface portion of the mounting end piece and concurrently, part of the projecting portion protruding from the mounting hole is upset and configured such that a peripheral wall, in longitudinal cross-section, of the projecting portion assumes such an arc profile that a projecting end surface side of the peripheral wall is located more radially outwardly and a marginal area of the projecting end surface on the peripheral wall side assumes a convex spherical form in the projecting direction, and so that the projecting portion of the mounting end piece fixed to the fixed plate member is not in pressure contact with the other plate surface of the fixed plate member,
the external peripheral surface of the projecting portion between the receiving surface portion of the mounting end piece and said other plate surface of the fixed plate member is formed as a surface with no angular portion in its longitudinal cross-section, and the internal peripheral surface of the mounting hole of the fixed plate member is formed as a surface with no angular portion in its longitudinal cross-section, and
a circular edge portion formed by said other plate surface of the fixed plate member extending in a direction perpendicular to the axial direction of the mounting hole and an internal peripheral surface of the mounting hole extending in the axial direction of the mounting hole is received in the axial direction of the mounting hole by the projecting portion of the mounting end piece with an arc shape in longitudinal cross-section.

2. The anti-vibration device as set forth in claim 1, wherein the projecting portion of the mounting end piece is provided with a hole formed concentrically with the projecting portion and opening on the projecting end surface side, and the projecting portion is subjected to upsetting working so that the fixed plate member may be fixed to the mounting end piece of the first fitting.

3. An anti-vibration device as set forth in claim 1, which further comprises a diaphragm attached to the second fitting to form a liquid-sealed chamber between it and the vibration isolating base,
a partition member separating the liquid-sealed chamber into a first liquid chamber on the vibration-isolating base side and a second liquid chamber on the diaphragm side,
an orifice bringing the first liquid chamber and the second chamber into communication with each other, and
a liquid filled in the liquid-sealed chamber,
the mounting end piece of the first fitting being located within the first liquid chamber, the fixed plate member being fixed to the mounting end piece of the first fitting and constituted as a stirring plate forming an orifice on the first liquid chamber side between an outer peripheral edge of the mounting end piece and an inner peripheral surface of the vibration isolating base.

4. An anti-vibration device as set forth in claim 2, which further comprises a diaphragm attached to the second fitting to form a liquid-sealed chamber between it and the vibration isolating base,
 a partition member separating the liquid-sealed chamber into a first liquid chamber on the vibration isolating base side and a second liquid chamber on the diaphragm side,
 an orifice bringing the first liquid chamber and the second chamber into communication with each other, and
 a liquid filled within the liquid-sealed chamber,
 the mounting end piece of the first fitting being located within the first liquid chamber,
 the fixed plate member being fixed to the mounting end piece of the first fitting and constituted as a stirring plate forming an orifice on the first liquid chamber side between an outer peripheral edge of the mounting end piece and an inner peripheral surface of the vibration isolating base.

5. The anti-vibration device as set forth in claim 1, wherein the mounting hole of the fixed plate member is provided with a receiving portion for accommodating an extra fillet fraction produced when the projecting portion of the mounting end piece is upset, the extra fillet fraction received in the receiving portion of the mounting hole serving as a whirl-stop for the fixed plate member against the mounting end piece.

6. The anti-vibration device as set forth in claim 2, wherein the mounting hole of the fixed plate member is provided with a receiving portion for accommodating an extra fillet fraction produced when the projecting portion of the mounting end piece is upset, the extra fillet fraction received in the receiving portion of the mounting hole serving as a whirl-stop for the fixed plate member against the mounting end piece.

7. The anti-vibration device as set forth in claim 3, wherein the mounting hole of the fixed plate member is provided with a receiving portion for accommodating an extra fillet fraction produced when the projecting portion of the mounting end piece is upset, the extra fillet fraction received in the receiving portion of the mounting hole serving as a whirl-stop for the fixed plate member against the mounting end piece.

8. The anti-vibration device as set forth in claim 5, wherein the mounting hole of the fixed plate member is constituted as a round hole assuming a generally circular form as viewed in front face; the round hole is defined on its inner periphery with a plurality of recessed portions for accommodating the extra fillet fraction so that the respective recessed portions are spaced nearly equidistantly apart from one another in the direction along an arc of the round hole; and
 the projecting portion of the mounting end piece is constructed as a columnar body having a somewhat smaller diameter than an inside diameter of the mounting hole of the fixed plate member.

9. The anti-vibration device as set forth in claim 5, wherein the mounting hole of the fixed plate member is constituted as such a configuration that part of the round hole in a generally circular form as viewed in front face is connected with a rectilinear line;
 the projecting portion of the mounting end piece is constructed as a columnar body having such an outside diameter that enables a revolution thereof in the mounting hole of the fixed plate member; the projecting portion of the mounting end piece is constructed, when inserted in the mounting hole, so that an unoccupied residual space within the mounting hole constitutes the receiving portion for the extra fillet fraction.

10. The anti-vibration device as set forth in claim 5, wherein the mounting hole of the fixed plate member is constructed as a generally elliptic hole as viewed in front face; and
 the projecting portion of the mounting end piece is constructed as a columnar body having an outside diameter enabling the revolution of the projecting portion within the mounting hole of the fixed plate member so that when the projecting portion is inserted in the mounting hole, an unoccupied residual space within the mounting hole may assume the receiving portion for accommodating the extra fillet fraction.

* * * * *